(12) United States Patent
Buffa et al.

(10) Patent No.: US 10,482,130 B2
(45) Date of Patent: Nov. 19, 2019

(54) THREE-DIMENSIONAL TREE DIAGRAMS

(71) Applicant: Capital One Services, LLC, McLean, VA (US)

(72) Inventors: Paul Buffa, Brooklyn, NY (US); Christopher Lanoue, Brooklyn, NY (US); R. M. Keelan Downton, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/924,747

(22) Filed: Mar. 19, 2018

(65) Prior Publication Data

US 2019/0286758 A1 Sep. 19, 2019

(51) Int. Cl.
*G06T 19/00* (2011.01)
*G06F 17/30* (2006.01)
(Continued)

(52) U.S. Cl.
CPC ........ *G06F 16/904* (2019.01); *G06F 16/2246* (2019.01); *G06T 19/006* (2013.01)

(58) Field of Classification Search
None
See application file for complete search history.

(56) References Cited

U.S. PATENT DOCUMENTS

| 2005/0132304 A1* | 6/2005 | Guido | G06F 17/30994 715/853 |
| 2006/0184461 A1* | 8/2006 | Mori | G06K 9/6219 706/13 |

(Continued)

FOREIGN PATENT DOCUMENTS

| JP | 2009276913 A | * 11/2009 | ........... G06K 9/6219 |
| JP | 2009276913 A | * 11/2009 | ........... G06K 9/6219 |
| JP | 2011108000 A | * 6/2011 | |

OTHER PUBLICATIONS

H Mesa, G Restrepo, "On dendrograms and topologies", MATCH Commun Math Comput Chem, 2008, http://match.pmf.kg.ac.rs/electronic_versions/Match60/n2/match60n2_371-384.pdf.*

(Continued)

*Primary Examiner* — Tize Ma
(74) *Attorney, Agent, or Firm* — DLA Piper LLP (US)

(57) ABSTRACT

In one aspect, the present disclosure relates to a method for improved computer-based visualization of a tree structure comprises: receiving a dataset defining the tree structure, the tree structure comprising a plurality of nodes and a plurality of edges; analyzing the dataset to determine constraint information for the tree structure; generating a first plurality of graphical objects corresponding to the node; positioning the first plurality of graphical objects within a three-dimensional coordinate space based on the constraint information, wherein all child nodes of a given node are arranged within a corresponding two-dimensional matrix; generating a second plurality of graphical objects corresponding to the edges; positioning the second plurality of graphical objects based on the positioning of the first plurality of graphical objects; and outputting a three-dimensional tree diagram of the tree structure comprising the first plurality of graphical objects and the second plurality of graphical objects.

19 Claims, 4 Drawing Sheets

(51) Int. Cl.
*G06F 16/904* (2019.01)
*G06F 16/22* (2019.01)

(56) References Cited

U.S. PATENT DOCUMENTS

2018/0001184 A1* 1/2018 Tran .................... H04N 5/2257
2018/0004715 A1* 1/2018 Street ................. G06F 17/2241
2019/0221039 A1* 7/2019 Korkin ................. G06T 19/006

OTHER PUBLICATIONS

Pasi Koikkalainen, "Tree Structured Self-Organizing Maps", in Kohonen Maps, edited by Erkki Oja and and Samuel Kaski, ISBN 978-0-444-50270-4 Copyright © 1999 Elsevier B.V. (Year: 1999).*
Marcos M. Campos, Gail A. Carpenter, "S-TREE: self-organizing trees for data clustering and online vector quantization", Neural Networks 14 (2001), pp. 505-525. (Year: 2001).*
Chen, et al., "Constructing Overview + Detail Dendrogram-Matrix Views," IEEE Trans Vis Comput Graph, 2009; 15(6): 889-896. doi: 10.1109/TVCG.2009.130., 21 pages.
Kinoshita, et al., "Visualizing Similar Text Documents Based on 3D Dendrogram," SICE Annual Conference 2010, Aug. 18-21, 2010, 4 pages.

* cited by examiner

THREE-DIMENSIONAL TREE DIAGRAMS

BACKGROUND

As is known the art, graphs can be used to model relationships between objects. The objects may be represented as nodes (or "vertices") and the object relationships may be represented as lines (or "edges") connecting the nodes. A tree is a type of graph that can be used to represent hierarchical data. Starting from a root node, each node in a tree can have zero, one, or more than one child nodes (or "children"). Nodes without children are referred to as leaf nodes. Each node within a tree, except for the root node, has exactly one parent node (or "parent").

As is also known in the art, various techniques exist for visualizing trees and other types of graphs. For example, a dendrogram is a type tree diagram frequently used to illustrate the arrangement of clusters produced by hierarchical clustering. In a dendrogram, the leaves may represent individual data points ("observations"), while the remaining nodes may represent different levels of clusters to which the data belong. As another example, the Tidy Tree layout algorithm can be used to generate two-dimensional (2D) tree diagrams based on an input dataset. For large trees (e.g., trees with hundreds or thousands of nodes) existing layout algorithms may produce tree diagrams that are so large, in terms of the number of pixels or inches required to fit the diagram, that it can be difficult to view and comprehend the diagrams.

SUMMARY

According to one aspect of the present disclosure, a method for improved computer-based visualization of a tree structure comprises: receiving a dataset defining the tree structure, the tree structure comprising a plurality of nodes and a plurality of edges; analyzing the dataset to determine constraint information for the tree structure, the constraint information comprising a depth of the tree structure and a number of child nodes at each level of the tree; generating a first plurality of graphical objects, each of the first plurality of graphical objects corresponding to a node of the tree structure; positioning the first plurality of graphical objects within a three-dimensional coordinate space based on the constraint information, wherein all child nodes of a given node are arranged within a corresponding two-dimensional matrix; generating a second plurality of graphical objects, each of the second plurality of graphical objects corresponding to an edge of the tree structure; positioning the second plurality of graphical objects based on the positioning of the first plurality of graphical objects; and outputting a three-dimensional tree diagram of the tree structure comprising the first plurality of graphical objects and the second plurality of graphical objects.

In some embodiments, the method comprises: receiving user input indicating a position for a root node of the tree structure; and repositioning the first plurality of graphical objects and the second plurality of graphical objects based on the position for the root node. In some embodiments, the method comprises scaling one or more of the first plurality of graphical objects in response to receiving the position for a root node. In some embodiments, outputting the three-dimensional tree diagram comprises outputting the outputting a three-dimensional tree diagram to a virtual reality (VR) device or an augmented reality (AR) device. In some embodiments, positioning the first plurality of graphical objects within a three-dimensional coordinate space comprises arranging all child nodes of a given node within a square matrix.

According to one aspect of the present disclosure, a method for improved computer-based visualization of a tree structure, comprises: receiving a dataset defining the tree structure, the tree structure comprising a plurality of nodes and a plurality of edges; analyzing the dataset to identify descendant nodes and sibling nodes; generating a first plurality of graphical objects, each of the first plurality of graphical objects corresponding to a node of the tree structure; positioning the first plurality of graphical objects within a three-dimensional coordinate space comprising a first dimension, a second dimension, and a third dimension, wherein descendant nodes are assigned different positions along the third dimension, wherein sibling nodes are assigned substantially the same position along the third dimension, and wherein sibling nodes are given different positions along the first and second dimensions; and generating a second plurality of graphical objects, each of the second plurality of graphical objects corresponding to an edge of the tree structure; positioning the second plurality of graphical objects based on the positioning of the first plurality of graphical objects; and outputting a three-dimensional tree diagram of the tree structure comprising the first plurality of graphical objects and the second plurality of graphical objects.

In some embodiments, the method comprises: receiving user input indicating a position for a root node of the tree structure; and repositioning the first plurality of graphical objects and the second plurality of graphical objects based on the position for the root node. In some embodiments, the method comprises scaling one or more of the first plurality of graphical objects in response to receiving the position for a root node. In some embodiments, outputting the three-dimensional tree diagram comprises outputting the outputting a three-dimensional tree diagram to a virtual reality (VR) device or an augmented reality (AR) device.

According to one aspect of the present disclosure, a system for improved computer-based visualization of a tree structure comprises: a processor; a volatile memory; and a non-volatile memory storing computer program code. When executed on the processor, the computer program code causes the processor to execute a process operable to: receive a dataset defining the tree structure, the tree structure comprising a plurality of nodes and a plurality of edges; analyze the dataset to determine constraint information for the tree structure, the constraint information comprising a depth of the tree structure and a number of child nodes at each level of the tree; generate a first plurality of graphical objects, each of the first plurality of graphical objects corresponding to a node of the tree structure; position the first plurality of graphical objects within a three-dimensional coordinate space based on the constraint information, wherein all child nodes of a given node are arranged within a corresponding two-dimensional matrix; generate a second plurality of graphical objects, each of the second plurality of graphical objects corresponding to an edge of the tree structure; position the second plurality of graphical objects based on the positioning of the first plurality of graphical objects; and output a three-dimensional tree diagram of the tree structure comprising the first plurality of graphical objects and the second plurality of graphical objects.

In some embodiments, the process is operable to: receive user input indicating a position for a root node of the tree structure; and reposition the first plurality of graphical objects and the second plurality of graphical objects based on the position for the root node. In some embodiments, the process is operable to: scale one or more of the first plurality of graphical objects in response to receiving the position for a root node. In some embodiments, outputting the three-dimensional tree diagram comprises outputting the outputting a three-dimensional tree diagram to a virtual reality (VR) device or an augmented reality (AR) device. In some embodiments, positioning the first plurality of graphical objects within a three-dimensional coordinate space comprises arranging all child nodes of a given node within a square matrix.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings.

The drawings are not necessarily to scale, or inclusive of all elements of a system, emphasis instead generally being placed upon illustrating the concepts, structures, and techniques sought to be protected herein.

DETAILED DESCRIPTION

Described herein are systems and methods for visualizing large-scale tree structures, hierarchical data, and other types of graphs in three dimensional space. In some embodiments, three-dimensional (3D) tree diagrams are generated by arranging child nodes within a 2D matrix that is offset from the parent node along a third dimension (e.g., the z-axis). The resulting tree diagram may take up less space along the x- and y-axes compared to tree diagrams generated using existing layout techniques. This may allow a user to visualize more of the data than was previously possible. The systems and methods disclosed herein provide an improvement upon existing computer-based data visualization techniques by optimizing space effectively for large tree/graph structures. In some embodiments, the resulting 3D tree diagrams may be optimized for display on virtual reality (VR) and augmented reality (AR) devices.

Figure 1:
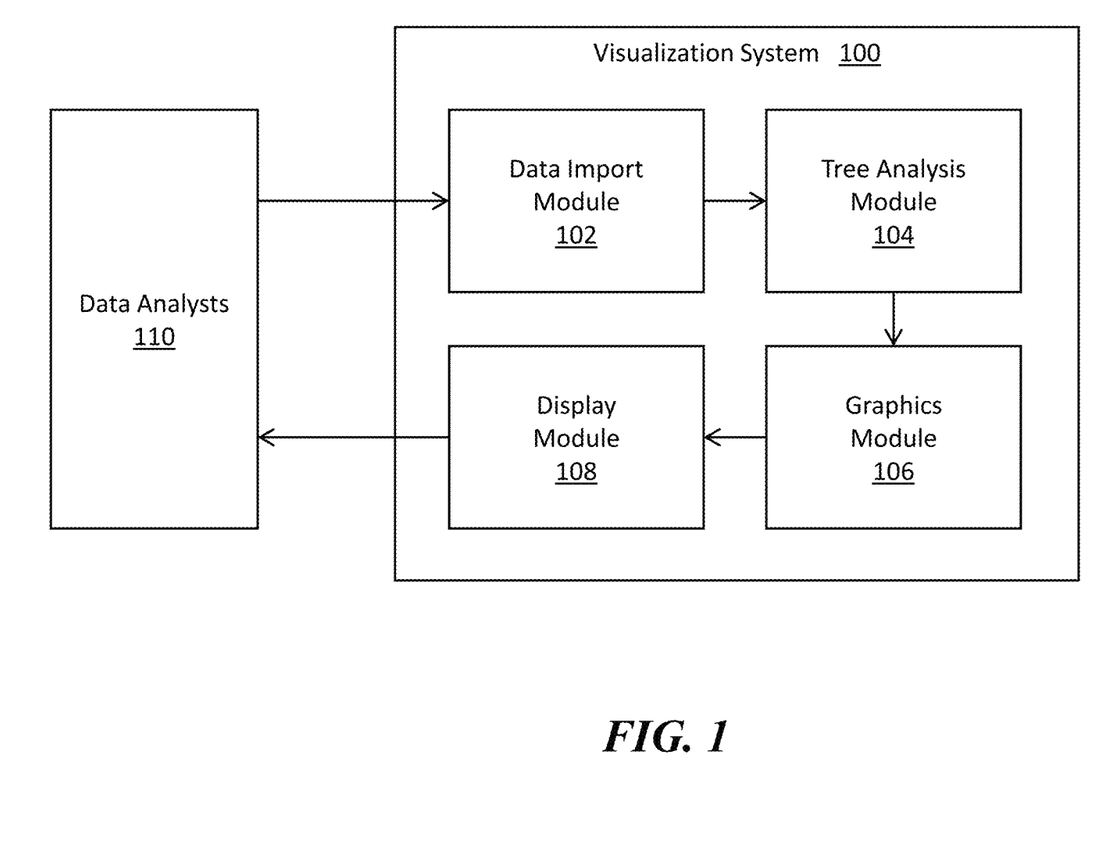
FIG. 1 is a block diagram of a system for generating three-dimensional (3D) tree diagrams, according to some embodiments of the present disclosure.

FIG. 1 shows a system 100 for generating 3D tree diagrams, according to some embodiments of the present disclosure. The illustrative system 100 includes a data import module 102, a tree analysis module 104, a graphics module 106, and a display module 108. Each of the modules 102-108 may include software and/or hardware configured to perform the processing described herein. In some embodiments, the system modules 102-108 may be embodied as computer program code executable on one or more processors (not shown). The modules 102-108 may be coupled as shown in FIG. 1 or in any suitable fashion.

The data import module 102 may receive a dataset from users (e.g., data analysts) 110 via, for example, an application programming interface (API). The dataset may define a tree or graph structure. In some embodiments, the dataset (or "tree data") may include a first array that defines the nodes of the tree, and a second array that defines the edges of the tree. The data import module 102 may accept tree data in one or more formats, such as comma-separated values (CSV) or eXtensible Markup Language (XML), and convert (or "normalize") the received data to an internal format, for example JavaScript Object Notation (JSON).

The tree analysis module 104 may analyze the normalized tree data to determine constraint information that can be used by the graphics module to generate a 3D diagram of the tree structure. In some embodiments, the tree analysis module 104 may calculate, for each node of the tree, a number of child nodes and a number of ancestor nodes. In some embodiments, the tree analysis module 104 may calculate, for each node in the tree, tree depth (or "level"), number of ancestors, number of children, and number of siblings. Siblings are nodes that have the same parent and same tree depth. In some embodiments, the analysis module 104 calculates per-node information by recursively going through all the parent-child relationships in the tree. The tree analysis module 104 may generate a lookup table (or "dictionary") storing the information calculated for each node.

The graphics module 106 may use the normalized tree data and the constraint information to generate a 3D diagram of the tree. In some embodiments, the graphics module 106 uses a matrix-based layout technique whereby nodes in a parent-child relationship are arranged along a z-axis, whereas sibling nodes—i.e. child nodes connected to the same parent node—may be arranged within a 2D matrix along x- and y-axes. In some embodiments, the graphics module 106 generates 3D tree diagrams similar to the example shown in FIG. 4. In some embodiments, the graphics module 106 generates 3D tree diagrams using processing described below with FIG. 5.

The graphics module 106 may use a 3D graphics library or platform to generate 3D tree diagrams. In some embodiments, the graphics module 106 can use the "Unity" gaming platform provided by Unity Technologies ApS to render the nodes and edges of the tree in three dimensions. For example, nodes may be rendered as cubes, spheres, or other 3D game-object primitives, and the edges may be rendered as line primitives. In some embodiments, edges are instantiated as cylinder primitives. Linear interpolation may be used to size a cylinder that connects two nodes, based on the two centroids (x,y,z coordinates) of the nodes and a Euclidian distance function.

The display module 108 may include hardware and/or software to output the generated 3D tree diagram to data analysts 110. For example, display module 108 may generate an image file that is sent to the users 110 via an API. As another example, display module 108 may correspond to a display device configured to display the 3D diagram. In some embodiments, the system 100 may correspond to a tablet or smartphone and the display module may correspond to a touchscreen display. In some embodiments, the display module 108 enables a user 110 to view the 3D tree diagram using a virtual reality (VR) device and/or an augmented reality (AR) device.

Figure 2:
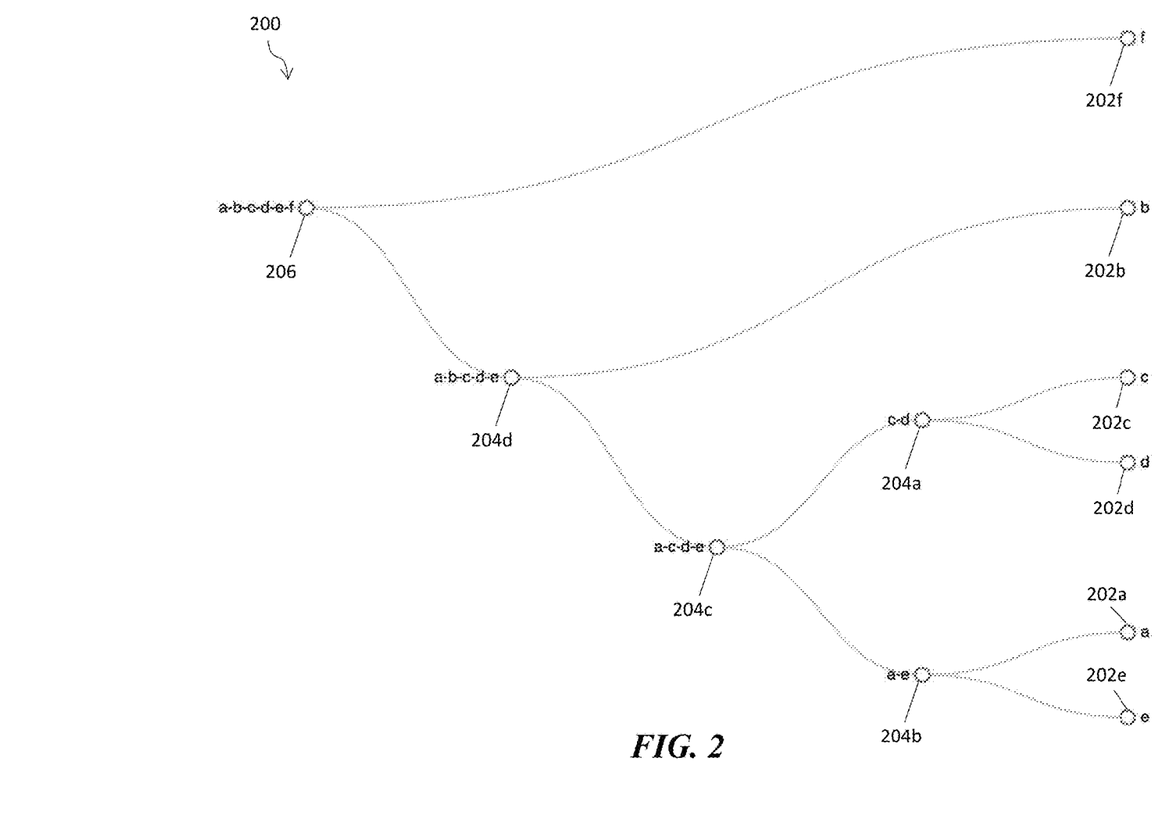
FIG. 2 is two-dimensional (2D) dendrogram for an example dataset, according to some embodiments of the present disclosure.

FIG. 2 shows an example of a 2D dendrogram 200 for a simple dataset, according to some embodiments of the present disclosure. The dataset includes observations labeled "a" through "e" which are arranged in hierarchical clusters. In a first level of clustering, observations "a" and "e" are clustered ("a-e"), and observations "c" and "d" are clustered ("c-d"). In a second level of clustering, clusters "a-e" and "c-d" are combined ("a-c-d-e"). In a third level of clustering, observation "b" is combined with cluster "a-c-d-e" ("a-b-c-d-e"). In a fourth level of clustering, observation "f" is combined with cluster "a-b-c-d-e" ("a-b-c-d-e-f"). This hierarchical clustering can be visualized using dendrogram 200. Within the dendrogram 200, observations "a" through "e" are represented by leaf nodes 202a-202e, respectively; nodes 204a and 204b correspond to the first level of clustering; node 204c corresponds to the second level of clustering; node 204d corresponds to the third level of clustering; and root node 206 corresponds to the fourth level of clustering.

The illustrative dendrogram 200 may be generated using an existing tree layout algorithm, for example using a Dendrogram layout algorithm. It will be appreciated that using a 2D tree layout algorithm (such as used in FIG. 2) to visualize large datasets can result in tree diagrams that are so large (in terms of the number of pixels or inches required to fit the diagram in x- and y-space) that it can be difficult to view and comprehend the diagrams.

Figures 3, 4:
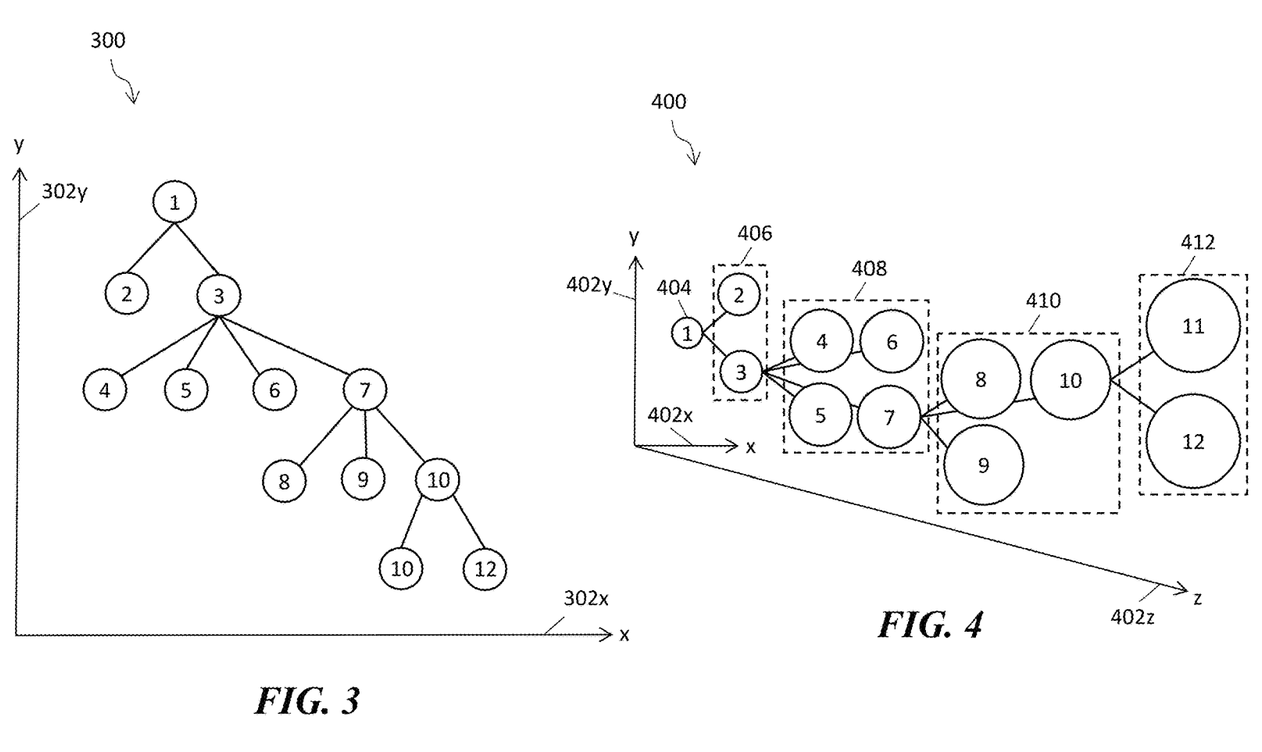
FIG. 3 is a 2D tree diagram for another example dataset, according to some embodiments of the present disclosure.
FIG. 4 is a 3D tree diagram corresponding to the same dataset as in FIG. 3, according to some embodiments of the present disclosure.

FIG. 3 shows an example of tree data 300, according to some embodiments of the present disclosure. To aid in understanding, tree data 300 is depicted in FIG. 3 using a 2D tree diagram. However, the tree data 300 could equivalently be represented using one or more arrays or using various other types of data structures.

Returning to FIG. 3, the illustrative tree data 300 includes twelve (12) nodes labeled "1" through "12," with node "1" corresponding to the root node and nodes "2," "4," "5," "6," "8," "9," "10," and "12" corresponding to leaf nodes. Nodes "2" and "3" are children of node "1", nodes "4" to "7" are children of nodes "3", nodes "8" to "10" are children of nodes "7", and nodes "11" and "12" are children of node "10."

In some embodiments, tree data 300 may be an example of data received as input to a visualization system (e.g., visualization system 100 of FIG. 1). In particular, tree data 300 may correspond to data received by data import module (e.g., module 102 of FIG. 1). In some embodiments, the tree data 300, or a normalized version thereof, may be analyzed by a tree analysis module (e.g., module 104 of FIG. 1) to generate constraint information useful for generating a 3D tree diagram.

FIG. 4 illustrates a 3D tree diagram 400 that may be generated for the tree data 300 shown in FIG. 3, according to embodiments of the present disclosure. In some embodiments, the diagram 400 may be generated by a graphics module (e.g., graphics module 106 of FIG. 1) using processing described below in conjunction with FIG. 5.

The illustrative diagram 400 is arranged along an x-axis 402x, a y-axis 402y, and a z-axis 402z. The twelve (12) nodes are labeled "1" through "12." To promote clarity in the drawings, the nodes in FIG. 4 are depicted as circles, but could, for example, be rendered as spheres, cubes, or other 3D graphical objects or primitives.

The root node "1" (labeled 404) has a certain position along the x-, y-, and z-axes. In some embodiments, the position of the root node may be specified by a user. In other embodiments, the position of the root node may be determined automatically based on the constraints of the 3D tree diagram.

In the embodiment of FIG. 4, all nodes that are children of a given parent node are arranged within the same 2D matrix. For example, child nodes "2" and "3" are arranged within a 2D matrix 406 defined along the x- and y-axes. In the embodiment shown, the matrix 406 is a 2×1 matrix with the child nodes "2" and "3" arranged in a column. In other embodiments, the matrix 406 could be a 1×2 matrix with the child nodes "2" and "3" arranged in a row. In general, an arbitrary number of child nodes can be arranged within a 2D matrix using any suitable layout strategy. In some embodiments, a layout strategy may seek to arrange the child nodes in a matrix in a square matrix (i.e., a matrix having an equal number of rows and columns) or as close to a square matrix as possible.

Referring to the embodiment of FIG. 4, to reduce the amount of space the diagram occupies in x- and y-space, child nodes may be positioned at different points along the x-axis 402z relative to their parent node. Thus, for example, the child nodes within matrix 404 have a different position along the z-axis 402z compared to root/parent node "1." To aid in understanding, the size of the nodes shown in FIG. 4 are proportional to their position along z-axis 402z. Thus, for example, nodes "2" and "3" are larger than node "1" in the figure.

Each of the child nodes within a matrix may be connected to the parent node using a line or other graphical object, representing an edge of the tree. For example, nodes "2" and "3" in FIG. 4 are connected to parent node "1" by lines that extend along the x-, y-, and/or z-axis.

This matrix-based layout strategy may be recursively applied to each parent/child relationship within the tree structure. For example, referring again to FIG. 4, node "3" has four children "4" to "7" which may be placed within a 4×4 matrix 408, node "7" has three children "8" to "10" which may be placed within matrix 410, and node "10" has two children "11" and "12" which may be placed within matrix 412. Each successive matrix 408, 410, and 412 may be positioned further along the z-axis, as shown.

The matrix-based layout technique disclosed herein can be applied to arbitrarily large data sets. In some embodiments, the resulting 3D tree diagram may be substantially smaller along the x- and/or y-axes compared to existing tree layout techniques.

Figure 5:
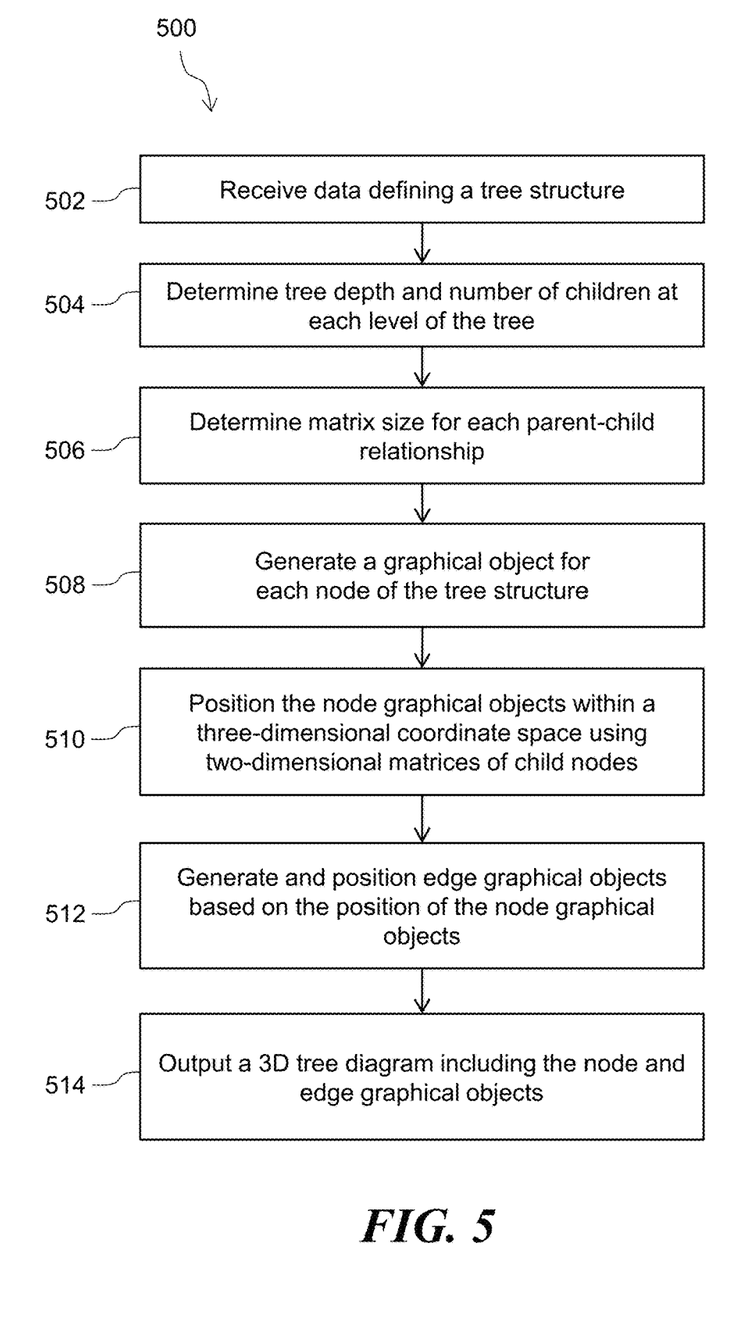
FIG. 5 is a flow diagram showing processing that may occur within the system of FIG. 1, according to some embodiments of the present disclosure.

FIG. 5 is a flow diagram showing processing that may occur within the system of FIG. 1, according to some embodiments of the present disclosure. A method 500 begins at block 502, where a dataset is received that defines a tree structure. In some embodiments, the dataset may be received via an API. In certain embodiments, the dataset (or "tree data") may be normalized, for example by converting it to JavaScript Object Notation (JSON).

The tree data may be analyzed to generate constraint information useful for generating a 3D tree diagram. At block 504, an overall tree depth and a tree level for each node may be determined by recursively going through all the parent child relationships of the tree structure. At block 506, this information may be used to determine the size of each matrix for each parent-child relationship. In some embodiments, per-node information may be stored in a lookup table.

At block 508, a 3D graphical object (e.g., a sphere, cube, etc.) may be generated for each node of the tree. At block 510, the constraint information may be used to arrange the child nodes objects into 2D matrices. For example, the node graphical objects may be positioned into matrices based on the number of siblings in the tree. In some embodiments, the matrices are positioned recursively, starting from the root node and traversing down the tree. A given matrix ("parent matrix") may include one or more sibling nodes, each having an arbitrary number of child nodes arranged in corresponding matrices ("child matrices"). In turn, each of sibling nodes in a child matrix can include one or more children arranged in a matrix, and so on down to the leaf nodes. Thus, the spacing between child matrices may be determined based on the number of sibling nodes within the parent matrix, the number of sibling nodes in each of the child matrices, and the number of sibling nodes in each recursive descendant matrix. For example, referring to FIG. 4, the position of matrix 408 may be determined based on the position of matrix 406, the number of siblings in matrix 406 (i.e., the size of matrix 406), and the number of siblings for each descendant of the sibling nodes in matrix 406, e.g., the size of each descendant matrix 408, 410, and 412.

At block 512, cylinders or other graphical objects may be generated for each edge of the tree. The edge objects may be positioned so as to connect to child node objects to their corresponding parent node object. At block 514, a 3D tree diagram that includes the node and edge graphical objects may be output to a display device. In some embodiments, the 3D tree diagram may be output to a virtual reality (VR) or augmented reality (AR) device.

In some embodiments, the method 500 may include receiving one or more parameters that are used to generate the 3D tree diagram. For example, the size of the node and edge graphical objects may be specified as parameters. The position and spacing of sibling and child matrices may be adjusted based on these parameters. As another example, a 3D transform may be specified to scale, offset, or perform other types of linear transformations on the tree diagram.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method implemented in a computer system comprising one or more processors and a display device, the one or more processors configured to execute instructions for improved computer-based visualization of a tree structure on the display device, the method comprising:
   receiving a dataset defining the tree structure, the tree structure comprising a plurality of nodes and a plurality of edges;
   analyzing the dataset to determine constraint information for the tree structure, the constraint information comprising a depth of the tree structure and a number of child nodes at each level of the tree;
   generating a first plurality of graphical objects, each of the first plurality of graphical objects corresponding to a node of the tree structure;
   positioning the first plurality of graphical objects within a three-dimensional coordinate space based on the constraint information, wherein the three-dimensional coordinate space comprises x, y, and z axes, wherein all child nodes of a given node are arranged within a corresponding two-dimensional matrix along the x and y axes, wherein descendant nodes are assigned different positions along the z axis, wherein there are at least two of the two-dimensional matrixes having different positions along the z axis, wherein a first one of the at least two of the two-dimensional matrixes comprises a first leaf node of the tree structure, wherein a second one of the at least two of the two-dimensional matrixes comprises a second leaf node of the tree structure;

generating a second plurality of graphical objects, each of the second plurality of graphical objects corresponding to an edge of the tree structure;

positioning the second plurality of graphical objects based on the positioning of the first plurality of graphical objects, wherein at least one of the second plurality of graphical objects comprises a geometric primitive that connects a first one of the first plurality of graphical objects and a second one of the first plurality of graphical objects;

using linear interpolation to size the geometric primitive based on a centroid of the first one of the first plurality of graphical objects, a centroid of the second one of the first plurality of graphical objects, and a distance function; and outputting, to the display device, a three-dimensional tree diagram of the tree structure comprising the first plurality of graphical objects and the second plurality of graphical objects.

2. The method of claim 1 comprising:
receiving user input indicating a position for a root node of the tree structure; and
repositioning the first plurality of graphical objects and the second plurality of graphical objects based on the position for the root node.

3. The method of claim 2 comprising:
scaling one or more of the first plurality of graphical objects in response to receiving the position for a root node.

4. The method of claim 1 wherein outputting the three-dimensional tree diagram comprises outputting the outputting a three-dimensional tree diagram to a virtual reality (VR) device.

5. The method of claim 1 wherein outputting the three-dimensional tree diagram comprises outputting the outputting a three-dimensional tree diagram to an augmented reality (AR) device.

6. The method of claim 1 wherein positioning the first plurality of graphical objects within a three-dimensional coordinate space comprises arranging all child nodes of a given node within a square matrix.

7. The method of claim 1 wherein generating the first plurality of graphical objects comprises generating a plurality of 3D game-object primitives of a first type using a 3D gaming platform, wherein generating the second plurality of graphical objects generating a plurality of 3D game-object primitives of a second type using the 3D gaming platform.

8. The method of claim 7 wherein the first type of 3D game-object primitive comprises a cubic or spherical primitive, wherein the second type of 3D game-object primitive comprises a cylindrical primitive.

9. A method implemented in a computer system comprising one or more processors and a display device, the one or more processors configured to execute instructions for improved computer-based visualization of a tree structure on the display device, the method comprising:
receiving a dataset defining the tree structure, the tree structure comprising a plurality of nodes and a plurality of edges;
analyzing the dataset to identify descendant nodes and sibling nodes;

generating a first plurality of graphical objects, each of the first plurality of graphical objects corresponding to a node of the tree structure;

positioning the first plurality of graphical objects within a three-dimensional coordinate space comprising a first dimension, a second dimension, and a third dimension, wherein descendant nodes are assigned different positions along the third dimension, wherein sibling nodes are assigned substantially the same position along the third dimension, and wherein sibling nodes are given different positions along the first and second dimensions, wherein all child nodes of a given node are arranged within a corresponding two-dimensional matrix, wherein there are at least two of the two-dimensional matrixes having different positions along the third dimension, wherein a first one of the at least two of the two-dimensional matrixes comprises a first leaf node of the tree structure, wherein a second one of the at least two of the two-dimensional matrixes comprises a second leaf node of the tree structure; and generating a second plurality of graphical objects, each of the second plurality of graphical objects corresponding to an edge of the tree structure;

positioning the second plurality of graphical objects based on the positioning of the first plurality of graphical objects, wherein at least one of the second plurality of graphical objects comprises a geometric primitive that connects a first one of the first plurality of graphical objects and a second one of the first plurality of graphical objects;

using linear interpolation to size the geometric primitive based on a centroid of the first one of the first plurality of graphical objects, a centroid of the second one of the first plurality of graphical objects, and a distance function; and outputting, to the display device, a three-dimensional tree diagram of the tree structure comprising the first plurality of graphical objects and the second plurality of graphical objects.

10. The method of claim 9 comprising:
receiving user input indicating a position for a root node of the tree structure; and
repositioning the first plurality of graphical objects and the second plurality of graphical objects based on the position for the root node.

11. The method of claim 10 comprising:
scaling one or more of the first plurality of graphical objects in response to receiving the position for a root node.

12. The method of claim 9 wherein outputting the three-dimensional tree diagram comprises outputting the outputting a three-dimensional tree diagram to a virtual reality (VR) device.

13. The method of claim 9 wherein outputting the three-dimensional tree diagram comprises outputting the outputting a three-dimensional tree diagram to an augmented reality (AR) device.

14. A system for improved computer-based visualization of a tree structure comprising:
a processor;
a display device; and
a non-volatile memory storing computer program code that when executed on the processor causes the processor to execute a process operable to:
receive a dataset defining the tree structure, the tree structure comprising a plurality of nodes and a plurality of edges;

analyze the dataset to determine constraint information for the tree structure, the constraint information comprising a depth of the tree structure and a number of child nodes at each level of the tree;

generate a first plurality of graphical objects, each of the first plurality of graphical objects corresponding to a node of the tree structure;

position the first plurality of graphical objects within a three-dimensional coordinate space based on the constraint information, wherein the three-dimensional coordinate space comprises a first dimension, a second dimension, and a third dimension, wherein all child nodes of a given node are arranged within a corresponding two-dimensional matrix along the first and second axes, wherein descendant nodes are assigned different positions along the third axis, wherein there are at least two of the two-dimensional matrixes having different positions along the third dimension, wherein a first one of the at least two of the two-dimensional matrixes comprises a first leaf node of the tree structure, wherein a second one of the at least two of the two-dimensional matrixes comprises a second leaf node of the tree structure;

generate a second plurality of graphical objects, each of the second plurality of graphical objects corresponding to an edge of the tree structure;

position the second plurality of graphical objects based on the positioning of the first plurality of graphical objects, wherein at least one of the second plurality of graphical objects comprises a geometric primitive that connects a first one of the first plurality of graphical objects and a second one of the first plurality of graphical objects;

use linear interpolation to size the geometric primitive based on a centroid of the first one of the first plurality of graphical objects, a centroid of the second one of the first plurality of graphical objects, and a distance function; and output, to the display device, a three-dimensional tree diagram of the tree structure comprising the first plurality of graphical objects and the second plurality of graphical objects.

15. The system of claim 14 wherein the process is operable to:
receive user input indicating a position for a root node of the tree structure; and
reposition the first plurality of graphical objects and the second plurality of graphical objects based on the position for the root node.

16. The system of claim 15 wherein the process is operable to:
scale one or more of the first plurality of graphical objects in response to receiving the position for a root node.

17. The system of claim 14 wherein outputting the three-dimensional tree diagram comprises outputting the outputting a three-dimensional tree diagram to a virtual reality (VR) device.

18. The system of claim 14 wherein outputting the three-dimensional tree diagram comprises outputting the outputting a three-dimensional tree diagram to an augmented reality (AR) device.

19. The system of claim 14 wherein positioning the first plurality of graphical objects within a three-dimensional coordinate space comprises arranging all child nodes of a given node within a square matrix.

\* \* \* \* \*